Figure 1:
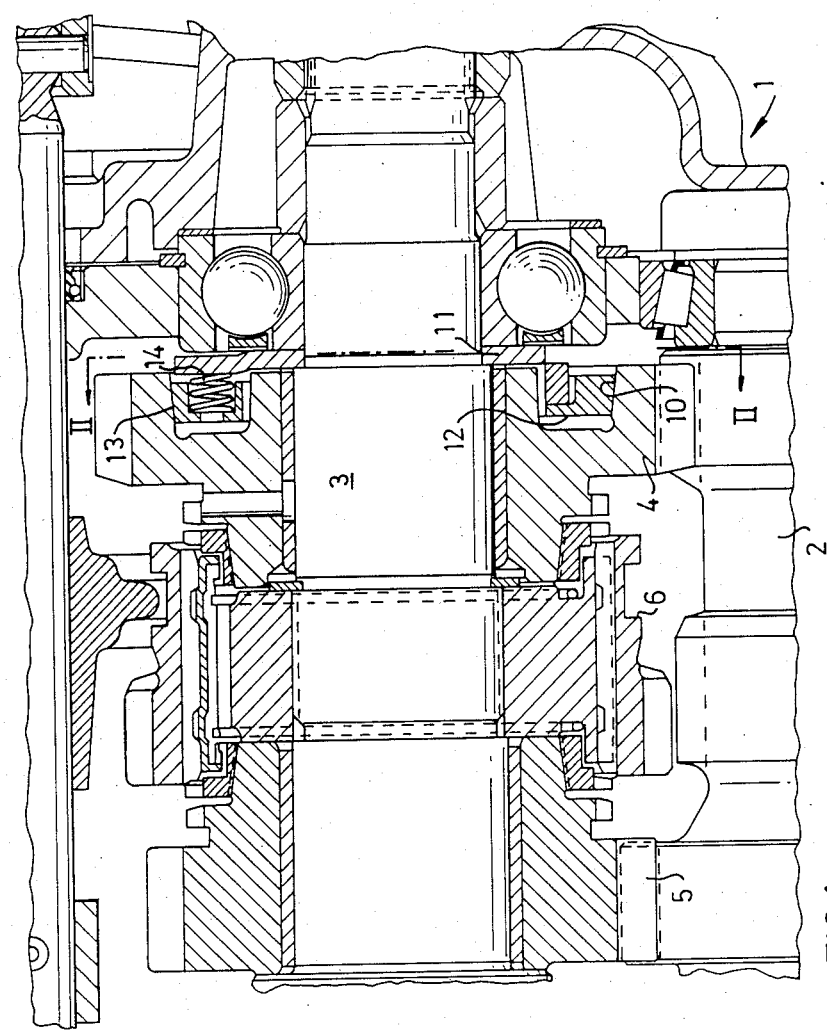

United States Patent [19]

Bengtsson

[11] Patent Number: 4,656,883
[45] Date of Patent: Apr. 14, 1987

[54] MOTOR VEHICLE GEARBOX

[75] Inventor: Lars Bengtsson, Kungsbacka, Sweden

[73] Assignee: AB Volvo, Gothenburg, Sweden

[21] Appl. No.: 642,768

[22] Filed: Aug. 21, 1984

[30] Foreign Application Priority Data

Aug. 23, 1983 [SE] Sweden ................... 8304563

[51] Int. Cl.⁴ .................... F16D 63/00; F16F 7/04; F16H 57/10
[52] U.S. Cl. .................... 74/411.5; 188/82.8; 188/82.9; 188/381
[58] Field of Search .......... 74/411.5, 333, 335; 192/30 V, 9 C, 20, 41 R; 188/381, 82.8, 82.9, 166, 167

[56] References Cited

U.S. PATENT DOCUMENTS

| 2,675,898 | 4/1954 | Morgan | 192/41 R |
| 2,993,579 | 7/1961 | Altmann | 192/20 |
| 3,745,847 | 7/1973 | Worner et al. | 74/411.5 |
| 4,225,024 | 9/1980 | Kuzma | 74/411.5 |
| 4,257,284 | 3/1981 | Ashauer et al. | 74/411.5 |
| 4,263,815 | 4/1981 | Ashauer | 74/411.5 |
| 4,370,896 | 2/1983 | Markfeld et al. | 74/411.5 |
| 4,510,819 | 4/1985 | Inui | 74/411.5 |
| 4,527,442 | 7/1985 | Hoffman et al. | 74/411.5 |

FOREIGN PATENT DOCUMENTS 1500516 7/1969 Fed. Rep. of Germany.

Primary Examiner—Allan D. Herrmann
Attorney, Agent, or Firm—Young & Thompson

[57] ABSTRACT

A vehicle gearbox has a brake for dampening idle rattling, which is in this case in the form of a conical frictional surface on the low-speed gearwheel on the output shaft and a brake cone carried by a disc fixed to the output shaft. The disc and the cone have coacting structure which presses the cone against the frictional surface when the low-speed gearwheel rotates more rapidly than the output shaft, and which presses the cone away from the frictional surface when the shaft rotates more rapidly than the gearwheel.

5 Claims, 5 Drawing Figures

MOTOR VEHICLE GEARBOX

The present invention relates to a motor vehicle gearbox comprising means for applying to shafts, with the gearbox in the neutral position, a torque directed counter to the input torque.

The crankshaft in piston combustion engines rotates with a certain amount of unevenness which, if not suppressed, gives rise to noise, so-called idle rattle, from the gear engagements in the gearbox. The lower the idle speed, the more marked is this rattle.

Several different methods are known for suppressing idle rattle. The simplest is to increase the idle speed, but this leads to increased fuel consumption and emissions. Another simple remedy is to use oil of higher viscosity, which provides greater resistance to rotation than the oil normally used in gearboxes. This results however in a decrease in efficiency and shifting quality. Another remedy based on the same principle, i.e. increasing the resistance in the gearbox, is to arrange a mechanical brake which constantly brakes one of the gears or shafts in the gearbox. This also results in decreased efficiency and shifting quality.

Unevenness can also be dampened out outside the gearbox. A number of car manufacturers presently use an extra damper mounted on the clutch disc. The disadvantages of such a solution are, among others, that it is expensive and sensitive. The characteristic of the damper must be adapted to every engine type. The play in the drive system as a whole is also increased, which increases the risk of such problems as "sawing" operation and impact when shifting under torque. Finally, dampening can be achieved by increasing the mass-moment of inertia, but as are the above remedies, this is an expensive solution which increases weight and weakens acceleration performance.

The purpose of the present invention is to achieve a gearbox of the above described type which uses the above-mentioned known principle of increasing the resistance in the gearbox, but without reducing efficiency and shifting quality.

This is achieved according to the invention by the fact that the means described by way of introduction comprise frictional surfaces on elements rotatable relative to each other and that cooperative parts, upon relative rotation between the elements in one direction, produce engagement between the frictional surfaces and, upon relative rotation in the opposite direction, at least essentially release said engagement.

Thus, in the solution according to the invention, the reversal of the rotational direction between two elements which are rotatable relative to each other is used to automatically release, when driving forward, the brake established by the frictional surfaces.

In a preferred embodiment, one braking element is formed by the low-speed gearwheel on the gearbox output shaft, while the second braking element is arranged on the carrier on the output shaft. When the vehicle is standing still and the gearbox is in the neutral position, the low-speed gearwheel rotates, while the output shaft is not moving, and the brake is actuated. When driving in first or low gear, there is no relative rotation between said gearwheel and the shaft, but when driving in all other forward gears the shaft will rotate more rapidly than the low-speed gear wheel, i.e. the relative rotation will be reversed with respect to the neutral position, and the brake will be disengaged.

Figure 3:
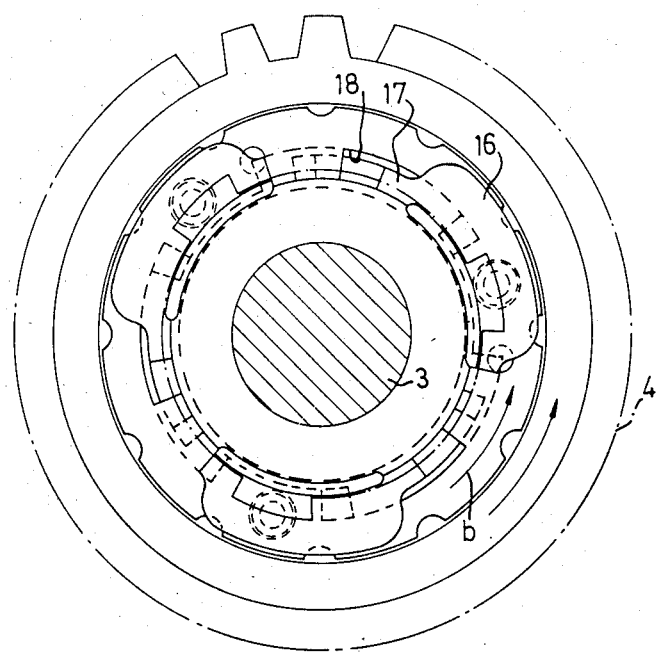
Figure 2:
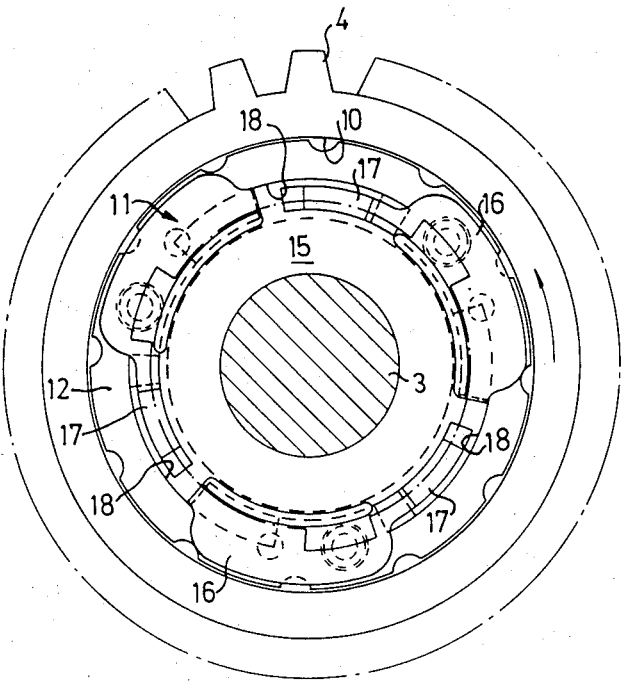
Figure 5:
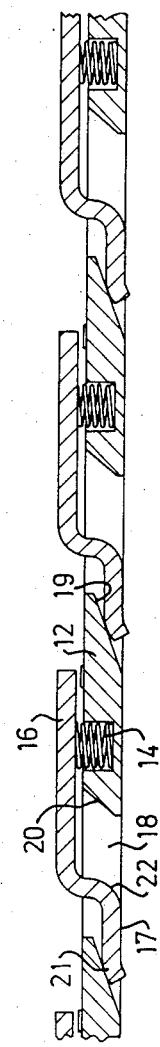
Figure 4:
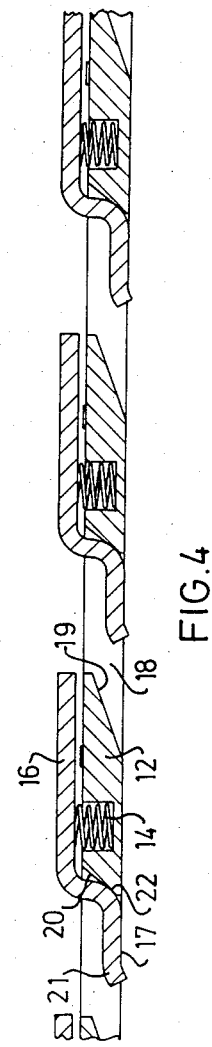

The invention will be described in more detail with reference to an example shown in the accompanying drawing, in which FIG. 1 shows a longitudinal section through a portion of vehicle gearbox, FIGS. 2 and 3 show a section along the line II—II in FIG. 1 illustrating the brake in the engaged and disengaged positions respectively, and FIGS. 4 and 5 show spread-out sectional views of the brake in FIGS. 2 and 3.

The gearbox 1 shown in FIG. 1 is in its basic design a conventional four-speed gearbox with an input shaft (not shown), an intermediate shaft 2 and an output shaft 3. The gearwheels for low gear and second gear respectively are indicated with 4 and 5 respectively, and they can be locked to or released from the output shaft 3 by means of a clutch sleeve 6.

According to the invention, the low-speed gearwheel 4 can be turned out on one side so as to create a conical frictional surface 10. A disc 11 is non-rotatably fixed to the shaft 3 by force fitting. The disc 11 serves as a carrier of a frictional element 12 of the same material as is used in synchronizing cones. The frictional element 12 has a conical surface 13 which cooperates with the frictional surface 10 on the low-speed gearwheel 4 and is urged against the frictional surface 10 by compression springs 14 disposed between the carrier 11 and the element 12.

The carrier 11 is made with an annular portion 15 from which three ears 16 extend radially, against which the springs 14 abut. Circumferentially directed strips 17 extend from these ears and are bent out of the plane of the ears and project into arcuate recesses 18 in the frictional element 12. As can be most clearly seen in FIGS. 4 and 5, the recesses are made with inclined end edges 19 and 20 respectively which cooperate with bent portions 21 and 22 respectively on the strips 17 of the carrier 11.

When the vehicle is stationary, with the gearbox in the neutral position, the low-speed gearwheel 4 will rotate in the direction of the arrow in FIG. 2, but the output shaft 3 will not rotate. Due to the relative rotation between the gearwheel 4 and the shaft 3, the frictional element 12 will assume the position shown in FIG. 2 relative to the gearwheel 4, and the springs will press the surfaces 13 of the frictional element into engagement with the conical surface 10 of the gearwheel 4, so that the rotating members will be subjected to a braking torque caused by the frictional engagement. The force applied will be increased due to the fact that the bent portions 22 of the carrier will at the same time press against the inclined edges 20 of the frictional element, so as to increase the braking torque. In this way the idle rattle from the gearbox is dampened even at very low idle speeds.

When driving in first gear, the frictional element 12 is still pressed against the gearwheel 4, but since the gearwheel 4 is then locked to the output shaft 3, this is irrelevant. Only when driving in higher gears is it desirable to remove the braking effect in order not to reduce efficiency and shifting quality. In the design shown and described here, this takes place as soon as there is a reversal of the relative rotation between the shaft 3 and the gearwheel 4, i.e. as soon as the shaft rotates more rapidly than the gearwheel 4, which occurs after engagement of second gear. The gearwheel 4 still rotates in the direction of the arrow, but since the shaft 3 is rotating more rapidly, as indicated by the arrow b (FIG.

3), the frictional element will be drawn a limited distance relative to the carrier 11 to the position shown in FIGS. 3 and 5. Due to engagement between the bent portions 21 of the carrier and the inclined edges 19 of the recesses, the frictional element 12 is pressed against the force of the springs 14 towards the carrier, so that engagement between the frictional surfaces will be reduced to a negligible level.

Thus the invention provides a simple, effective and automatically releasing brake device, which does not have the disadvantages of the known constantly engaged brakes and which, due to its use of the low-speed gearwheel as one of the frictional elements, only requires minimal space. The invention is however not limited to the embodiment described, but encompasses embodiments with frictional surfaces on other parts rotating relative to each other, in which the above-described reversal of relative rotation takes place.

What I claim is:

1. Motor vehicle gearbox, comprising brake means for applying to a gear, with the gearbox in a neutral position, a limited braking torque directed counter to an input torque, characterized in that said brake means comprise frictional surfaces on elements rotatable relative to each other and that cooperating parts, upon relative rotation between the elements in one direction, produce engagement between the frictional surfaces and upon relative rotation in the opposite direction at least substantially release said engagement, said cooperating parts comprising spring means for urging said frictional surfaces into engagement responsive to relative rotation of said elements in said one direction.

2. Gearbox according to claim 1, characterized in that one of said rotatable elements is formed of a gearwheel for a lowest forward speed, which is rotatably mounted on an output shaft and can be locked to the output shaft by clutch means, while the other rotatable element is formed by a carrier non-rotatably joined to the output shaft and a frictional element carried on the carrier and which is limitedly rotatable and axially displaceable relative to the carrier, so that limited rotation of the carrier relative to the frictional element in one direction produces axial displacement of the frictional element towards a frictional surface on the gearwheel, while corresponding rotation in the opposite direction produces displacement of the frictional element in the opposite direction.

3. Gearbox according to claim 2, characterized in that spring means are arranged between the carrier and the frictional element, which urge the frictional element towards the frictional surface of the gearwheel, and that the carrier and the frictional element have cooperating inclined surfaces which, upon rotation in said opposite direction, produce a displacement of the frictional element counter to the direction of the spring force.

4. Gearbox according to claim 3, characterized in that the carrier and the frictional element have additional cooperating surfaces which, upon rotation in said first-mentioned direction, urge the frictional element in the direction of the spring force.

5. In a synchromesh gearbox having a driven shaft, a lowest forward gear rotatably mounted on said driven shaft, and means for selectively fixing said gear to said shaft, the improvement comprising: a first frictional surface disposed on said gear, a carrier element fixed to said shaft, said carrier element comprising a second frictional surface, means responsive to relative rotation of said gear and said shaft in one direction to engage said first and second frictional surfaces to product a limited braking force, and means responsive to relative rotation of said gear and said shaft in the opposite direction at least substantially to disengage said first and second frictional surfaces.

* * * * *